United States Patent
Martel et al.

(10) Patent No.: US 12,473,834 B2
(45) Date of Patent: Nov. 18, 2025

(54) WEAR RESISTANT COATING, METHOD OF MANUFACTURE THEREOF AND ARTICLES COMPRISING THE SAME

(71) Applicant: Raytheon Technologies Corporation, Farmington, CT (US)

(72) Inventors: Nathan T. Martel, Glastonbury, CT (US); Gary M. Lomasney, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 864 days.

(21) Appl. No.: 17/086,883

(22) Filed: Nov. 2, 2020

(65) Prior Publication Data

US 2021/0047935 A1    Feb. 18, 2021

Related U.S. Application Data

(62) Division of application No. 15/421,785, filed on Feb. 1, 2017, now Pat. No. 10,822,967.

(51) Int. Cl.
  *B32B 15/01*    (2006.01)
  *C25D 3/12*     (2006.01)
  (Continued)

(52) U.S. Cl.
  CPC .............. *F01D 5/288* (2013.01); *B32B 15/01* (2013.01); *C25D 3/12* (2013.01); *C25D 15/00* (2013.01);
  (Continued)

(58) Field of Classification Search
  None
  See application file for complete search history.

(56) References Cited

U.S. PATENT DOCUMENTS 3,199,836 A    8/1965  Moyer
4,356,037 A *  10/1982 Novak ............... C09D 7/70
                                              404/19
(Continued)

FOREIGN PATENT DOCUMENTS

EP    0484115 A1    5/1992
EP    2540961 A2    1/2013
(Continued)

OTHER PUBLICATIONS

Extended European Search Report dated Jul. 2, 2018 for corresponding European Patent Application No. 18154771.2.
(Continued)

*Primary Examiner* — Mary I Omori
(74) *Attorney, Agent, or Firm* — Bachman & LaPointe, P.C.

(57) ABSTRACT

An abrasive coating for a substrate comprises a strike layer is formed on a substrate top surface; a base layer is coupled to the strike layer; a tack layer is coupled to the base layer, wherein the tack layer is configured to adhere first grit particles to the base layer; a plurality of first grit particles are adapted to be coupled to the tack layer, a plurality of second grit particles are placed between each of the plurality of first grit particles, the second grit particles having a nominal size smaller than the first grit particles; and an overplate layer comprising a matrix material is bonded to the tack layer; the matrix material envelops the second grit particles and bonds and partially surrounds the first grit particles, wherein the first grit particles extend above the overplate layer.

6 Claims, 7 Drawing Sheets

(51) Int. Cl.
 C25D 15/00 (2006.01)
 F01D 5/28 (2006.01)
 F01D 11/12 (2006.01)
 F01D 21/04 (2006.01)
 C25D 7/00 (2006.01)

(52) U.S. Cl.
 CPC .......... *F01D 11/122* (2013.01); *F01D 21/045* (2013.01); *C25D 7/00* (2013.01); *F05D 2230/31* (2013.01); *F05D 2240/307* (2013.01); *F05D 2300/611* (2013.01); *Y02T 50/60* (2013.01)

(56) References Cited

U.S. PATENT DOCUMENTS

| | | | |
|---|---|---|---|
| 4,608,128 A | | 8/1986 | Farmer et al. |
| 4,608,145 A | | 8/1986 | Fairbanks |
| 4,610,698 A | * | 9/1986 | Eaton ...................... F01D 11/12 51/293 |
| 4,655,884 A | | 4/1987 | Hills et al. |
| 5,074,970 A | | 12/1991 | Routsis et al. |
| 5,076,897 A | | 12/1991 | Wride et al. |
| 5,464,524 A | | 11/1995 | Ogiwara et al. |
| 5,702,574 A | | 12/1997 | Foster et al. |
| 5,935,407 A | | 8/1999 | Nenov et al. |
| 5,942,015 A | | 8/1999 | Culler et al. |
| 6,194,086 B1 | * | 2/2001 | Nenov .................... C23C 28/00 428/678 |
| 6,706,319 B2 | | 3/2004 | Seth et al. |
| 6,896,485 B2 | | 5/2005 | Ohara et al. |
| 8,807,955 B2 | | 8/2014 | Wrabel et al. |
| 2010/0129673 A1 | | 5/2010 | Lee |
| 2013/0084786 A1 | * | 4/2013 | Rehrig .................. B24D 18/00 451/539 |
| 2016/0160661 A1 | | 6/2016 | Balbach et al. |
| 2016/0237831 A1 | * | 8/2016 | Strock ...................... B05D 5/00 |
| 2016/0237832 A1 | | 8/2016 | Strock |
| 2017/0343003 A1 | | 11/2017 | Burlatsky et al. |
| 2018/0195192 A1 | | 7/2018 | Martel et al. |

FOREIGN PATENT DOCUMENTS

| | | |
|---|---|---|
| EP | 3056679 A1 | 8/2016 |
| GB | 2162200 A | 1/1986 |

OTHER PUBLICATIONS

Anonymous: "Electroplating—Wikipedia", Oct. 30, 2016, XP055477764, https://en.widipedia.org, Retrieved from the Internet: URL:https://en.wikipedia.org/w/index.php?title=Electroplating&oldid=746966845. *p. 2, last line-p. 3, line 10. [retrieved May 23, 2018].

* cited by examiner

WEAR RESISTANT COATING, METHOD OF MANUFACTURE THEREOF AND ARTICLES COMPRISING THE SAME

CROSS-REFERENCE TO RELATED APPLICATION

This application is a divisional of U.S. patent application Ser. No. 15/421,785, filed Feb. 1, 2017.

BACKGROUND

The present disclosure is directed to a wear resistant coating, a method of manufacture thereof and to articles comprising the same. In particular, the present disclosure relates to a wear resistant coating for turbomachinery and, more particularly, to turbomachine components having abrasive coatings.

Turbomachinery, such as gas turbine engines, have rotors with one or more rows of rotating blades. Radially outward tips of the blades are located in close proximity to a typically stationary surface which is, or acts as, a seal. To maximize engine efficiency, leakage of gas or other working fluid around the blade tips should be minimized. This may be achieved by configuring the blade tips and seal such that they contact each other during periods of operation of the turbomachine, such as during initial operation of the turbomachine referred to as the green run, during normal operation, and possibly during other operating conditions such as a bird strike. With such a configuration, the blade tips act as an abrading component and the seal can be provided as an abradable seal. Generally, the blade tip is harder and more abrasive than the seal. Thus, the blade tips will abrade or cut into the abradable seal during those portions of the engine operating cycle when the blade tip comes into contact with the abradable seal. This interaction between blade tips and seal is desirable as it helps to provide minimal leakage between blade tips and seal.

Since gas turbine engines, such as aircraft gas turbine engines, experience cyclic mechanical and thermal load variations during operation, their geometry varies during different stages of the operating cycle. Thus, the blade tips should retain their cutting capability over many operating cycles compensating for any progressive changes in gas turbine engine geometry.

During certain engine operating conditions, such as during a bird strike or engine surge, gas turbine engines have shown high radial interaction rates between the blade tips and abradable seals (~40"/s) that can cause rapid depletion of the abrasive blade tip coating when rubbed against the abradable seals. Low radial interaction rates, which occur during certain engine operating conditions such as during low transient thermal or mechanical loading cycles (for example during the green run), can also result in excessive wear and damage to abradable seals through the generation of large thermal excursion within the seal system (abrasive tip and abradable seal).

If the abrasive coating on the blade tip is depleted, unwanted sliding contact or rubbing of the base material of the blade tip, such as titanium, nickel, steel, and aluminum alloys, and the abradable seal may occur. This results in direct contact between the base material of the blade tip and the abradable seal. Contact of base material with the abradable seal can cause unwanted conditions within the gas turbine engine.

An alternative blade tip and seal configuration and method of applying the blade tip abrasive coating is needed for enabling reduced clearance during normal running and other transient conditions, while addressing the above-described issues.

SUMMARY

In accordance with the present disclosure, there is provided an abrasive coating for a substrate, comprising a top surface formed on the substrate; a strike layer formed on the top surface; a base layer coupled to the strike layer; a tack layer coupled to the base layer; a plurality of first grit particles coupled to the tack layer, wherein the plurality of first grit particles are spaced apart to form channels; a plurality of second grit particles placed between each of the plurality of first grit particles, the second grit particles having a nominal size smaller than the first grit particles; and an overplate layer comprising a matrix material bonded to the tack layer; the matrix material envelops the second grit particles and the matrix material bonds to and partially surrounds the first grit particles, wherein the first grit particles extend above the overplate layer.

In another and alternative embodiment, the first grit particles are selected from the group consisting of a cubic boron nitride material, coated silicon carbide (SiC), aluminum oxide and diamond.

In another and alternative embodiment, the matrix material comprises a matrix formed from at least one of Ni, Co and MCrAlY, wherein M is Ni, or Co, or a combination thereof.

In another and alternative embodiment, the second grit particles are selected from the group consisting of alumina, silicon nitride, and cubic boron nitride.

In another and alternative embodiment, the second grit particles range from about 75% to about 98% of the total number of the first grit particles and second grit particles.

In another and alternative embodiment, the overplate layer comprises a height from the tack layer of 50 to 90% of the height of the first grit particles.

In accordance with the present disclosure, there is provided a turbine engine component comprising an airfoil having a tip, the tip having a top surface; a composite abrasive coating bonded to the top surface; the composite abrasive coating comprising a strike layer formed on the top surface; a base layer coupled to the strike layer opposite the top surface; a tack layer coupled to the base layer opposite the base layer; a layer of first grit particles coupled to the tack layer opposite the base layer; an overplate layer comprising a matrix material bonded to the tack layer; a plurality of second grit particles enveloped in the matrix material and dispersed around the first grit particles and surrounding an unexposed portion of the first grit particles, the second grit particles being smaller than the first grit particles.

In another and alternative embodiment, the first grit particles have average particle sizes from about 40 to about 1000 microns.

In another and alternative embodiment, the second grit particles have average particle sizes from about 0.5 to about 2 microns.

In another and alternative embodiment, an average particle size of the first grit particles is up to 10 times and average particle size of the second grit particles.

In another and alternative embodiment, the turbine engine component further comprises at least one channel formed between the first grit particles, the channels having a width of 1-3 diameters of the first grit particles.

In another and alternative embodiment, the at least one channel has a depth of about 50% to 10% of the height of the first grit particles.

In accordance with the present disclosure, there is provided a process for coating a turbine engine airfoil with an abrasive, the process comprising depositing a strike layer onto a tip portion; depositing a base layer on the strike layer opposite the tip portion; tacking first grit particles to the base layer opposite the strike layer by depositing a tack layer; and depositing an overplate layer over the base layer and around a portion of the first grit particles, wherein the overplate layer comprises a matrix containing a plurality of second grit particles.

In another and alternative embodiment, depositing the strike layer comprises electrolytically depositing a nickel strike layer using a nickel strike solution comprising a nickel chloride and hydrochloric acid In another and alternative embodiment, depositing the base layer comprises electrolytically depositing a layer of nickel from a nickel sulfamate plating solution.

In another and alternative embodiment, tacking the first grit particles comprises electrolytically depositing nickel around the first grit particles securing the first grit particles into place on the base layer.

In another and alternative embodiment, depositing the overplate layer comprises electrolytically depositing nickel from a sulfamate nickel plating bath along with the second grit particles suspended in the sulfamate nickel plating bath so that a matrix containing the second grit particles is built up around the first grit particles and on top of the tack layer wherein the matrix envelops the second grit particles and partially surrounds the first grit particles with a portion of the first grit particles remaining exposed.

Other details of the wear resistant coating incorporating multiple sizes of super abrasive particles are set forth in the following detailed description and the accompanying drawing wherein like reference numerals depict like elements.

DETAILED DESCRIPTION

Figure 1:
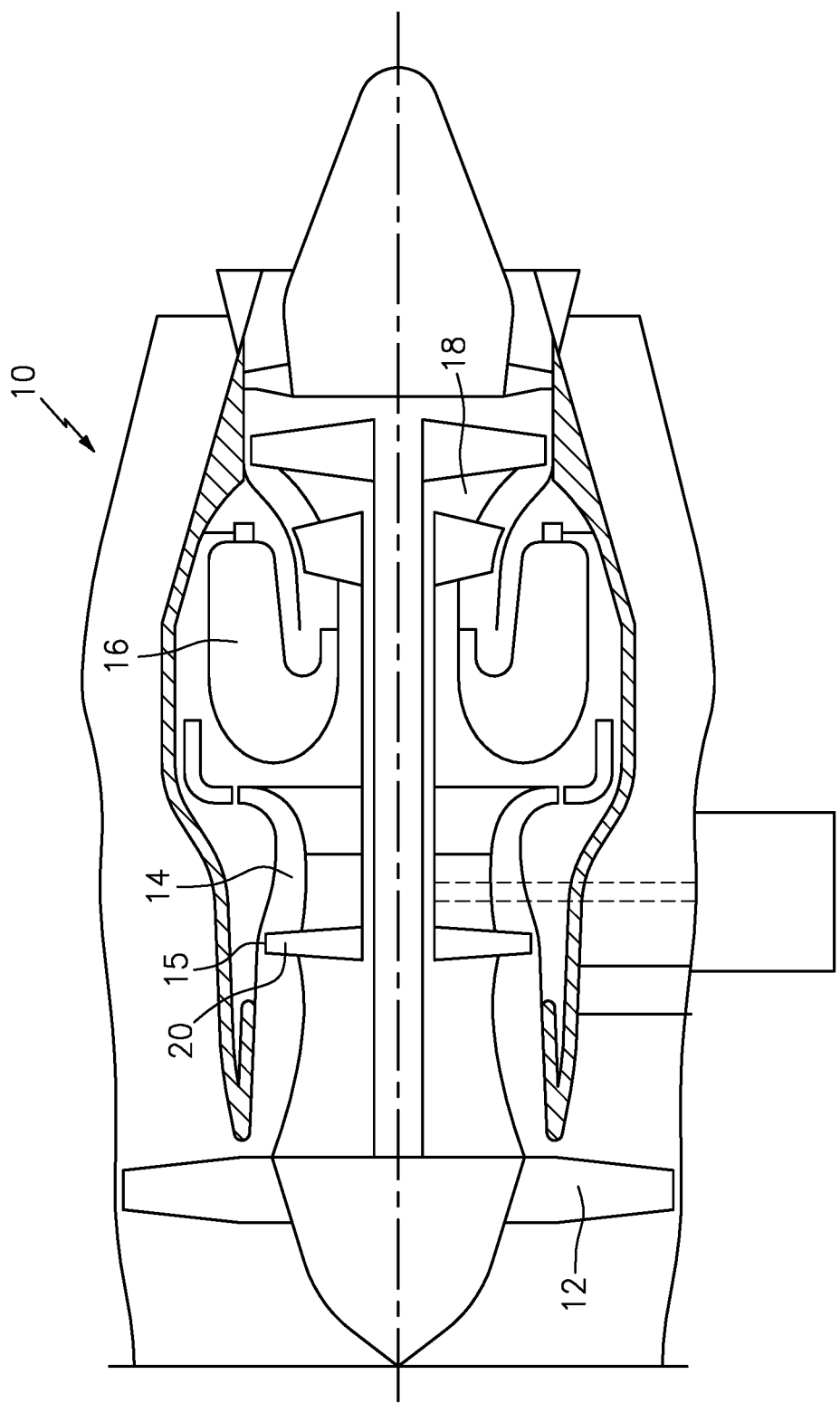
FIG. 1 is a schematic cross-sectional view of a turbofan gas turbine engine.

FIG. 1 illustrates a turbomachine in the form of a gas turbine engine 10, of a type provided for use in subsonic and/or supersonic flight, generally comprising in serial flow communication a fan section having fan blades 12 through which ambient air is propelled, a compressor section 14 for pressurizing the air, a combustor 16 in which the compressed air is mixed with fuel and ignited for generating hot combustion gases, and a turbine section 18 for extracting energy from the combustion gases. The compressor section 14 in an exemplary embodiment is an axial compressor section, and includes one or more stages 15, each stage 15 having a rotor 20. Although a turbofan engine is depicted and described herein, it will be understood that the present disclosure relates broadly to various embodiments of turbines and compressors such as turbo-shafts, turbo-props, turbojets or auxiliary power units, as non-limiting examples.

The turbine engine component 110 may be formed from a titanium-based alloy or a nickel-based alloy. On the tip 114 of the airfoil portion 112, a composite material 122 (not shown in the FIG. 1) is applied for rub and abradability against the abradable coating (not shown).

The disclosure relates to application of abrasive coatings to the tips of blades of rotor 20 of a turbomachine, as well as a system including such a rotor and a corresponding abradable surface, and a method for making such a rotor.

Figure 2:
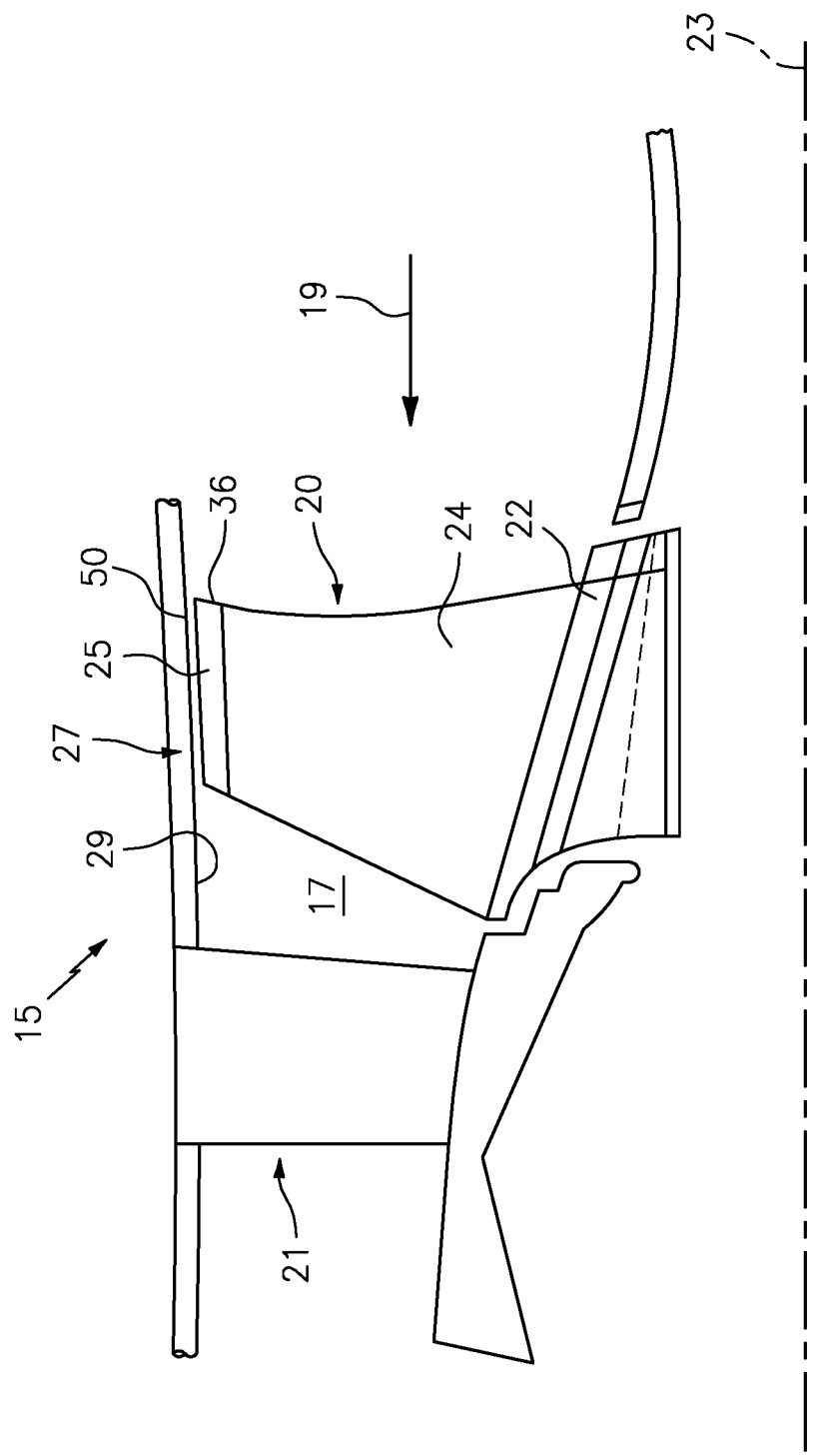
FIG. 2 is a partial cross-sectional view of an axial compressor of the gas turbine engine of FIG. 1.

FIG. 2 illustrates further detail of a stage 15 of the compressor section 14 of the gas turbine engine 10 which generally comprises rotor 20 and a stator 21 downstream relative thereto, each rotor 20 and stator 21 having a plurality of blades disposed within the gas flow path 17 (the gas path including the compressor inlet passage upstream of the compressor section 14 and the compressor discharge passage downstream of the compressor section 14 (see FIG. 1)). Gas flowing in direction 19 is accordingly fed to the compressor section 14 via the compressor inlet passage of the gas flow path 17 and exits therefrom via the compressor discharge passage.

Rotor 20 rotates about a central axis of rotation 23 within a stationary and circumferentially extending outer casing or shroud 27, the radially inwardly facing wall 29 of which defines a circumferential outer boundary of the annular gas flow path 17 through the compressor section 14. As will be described in further detail below, rotor 20 includes a central disc or hub 22 and a plurality of blades 24 radially extending therefrom and terminating in blade tips 25 immediately adjacent outer shroud 27.

Rotors such as rotor 20 can be of any variety of rotor, with one exemplary embodiment being an integrally-bladed rotor (IBR). IBRs are formed of a unitary or monolithic construction, wherein the radially projecting rotor blades are integrally formed with the central hub. Although the present disclosure will focus on an axial compressor rotor that is an IBR, it is to be understood that the presently described configuration could be equally applied to other types of rotor such as impellors (i.e. centrifugal compressors) which may or may not be IBRs, to IBR fans, or to other rotors used in the compressor or turbine of a gas turbine engine.

Figure 3:
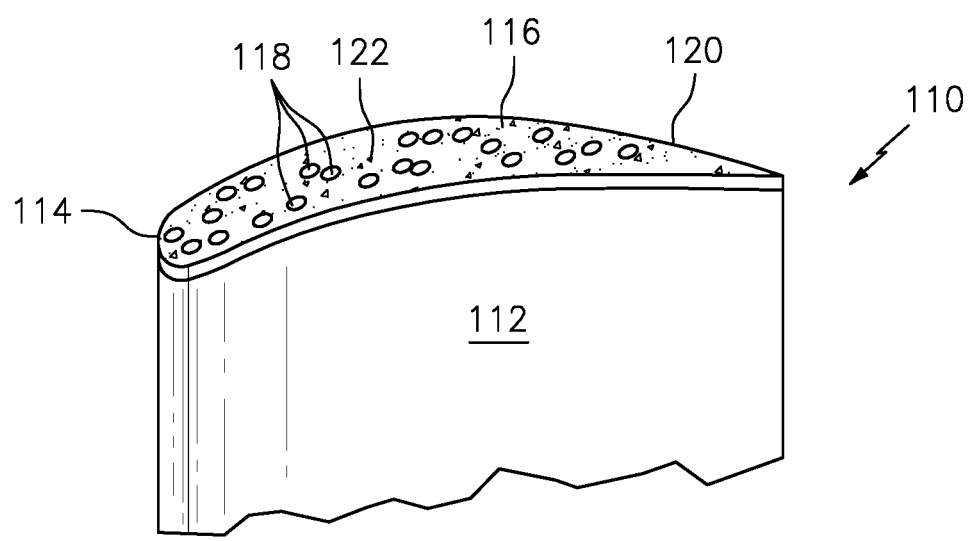
FIG. 3 is a schematic representation of an abrasive composite coating applied to a tip of a turbine engine component.

Referring now to FIG. 3 there is illustrated a turbine engine component 110, such as a compressor blade or vane. The blade 110 has an airfoil portion 112 with a tip 114. The tip 114 has an abrasive coating 116 applied to it. The abrasive coating 116 comprises a composite material that includes an abrasive particulate/grit or simply first grit 118, such as cubic boron nitride (CBN), coated silicon carbide (SiC), or another hard ceramic phase. Examples of hard ceramic phase can include diamond, oxide, carbide and nitride based materials with hardness of 8 or higher on the Mohs scale. While CBN and SiC are hard ceramic materials, other options could include aluminum oxide, silicon nitride and diamond. The first grit 118 can be sized as a coarse grit. In an exemplary embodiment the first grit 118 can be sized from about 40 to about 1000 microns, preferably about 50 microns to about 200 microns. In another exemplary embodiment the first grit 118 can be sized from about 60 microns to about 150 microns (0.06 to about 0.15 millimeters (mm)). The first grit 118 is embedded in a plating or other type layer matrix composite 120. The matrix 120 comprises a suitable oxidation-resistant alloy matrix. In an exemplary embedment the layer comprises a matrix formed from Ni, Co, or MCrAlY, the M standing for either Ni or Co or both. In an exemplary embodiment, the matrix 120 can comprise pure nickel, nickel alloy, copper, copper alloy, cobalt, cobalt alloy, chrome or other alloys. In an exemplary embodiment, the matrix 120 for compressor applications can include nickel material, but could be another plating of a pure metal or alloy deposit. In an exemplary embodiment, the co-deposition of nickel or cobalt with a dispersion of MCrAlY powder to form and oxidation resistant matrix can be utilized for hot turbine section abrasive blade tip applications.

A second grit 122 is interspersed between the first grit 118. The second grit 122 is a smaller sized particle than the larger first grit material 118. In an exemplary embodiment, the second grit 122 is sized to about 1/10 the size of the first grit 118. The second grit 122 can be from about 1% to about 10% of the diameter of the first grit 118. The second grit 122 may be $Al_2O_3$ (alumina), $Si_3N_4$ (silicon nitride), CBN (cubic boron nitride), or other similar abrasive particles. The percentage of first grit particles within the mixture should range from 2% to 25% of the sum of the first grit 118 and the second grit 122 particles. This sum can be called the total number of particles. Second grit particles range from about 75% to about 98% of the total number of particles.

Second grit 122 particles are placed within the overplate layer 138 in one or more layers, to produce a total overplate layer 138 height from the tack layer 136 material that is 50-90% of the height of the first grit 118. First grit particles 118 can be 50%-90% recessed below the height of the plating layer 138 height. In an exemplary embodiment, the matrix 120 surrounds the first grit particles 118 from 50% to 90% of the overall first grit particle 118 height. The resulting blade tip 114 with abrasive coating 116 is particularly well suited for rubbing metal as well as ceramic abradable seals (not shown).

The turbine engine component/blade 110 may be formed from a titanium-based, nickel-based, iron-base, or other alloy. In an exemplary embodiment, the blade 110 includes a (Ti) titanium-based alloy.

Figure 4:
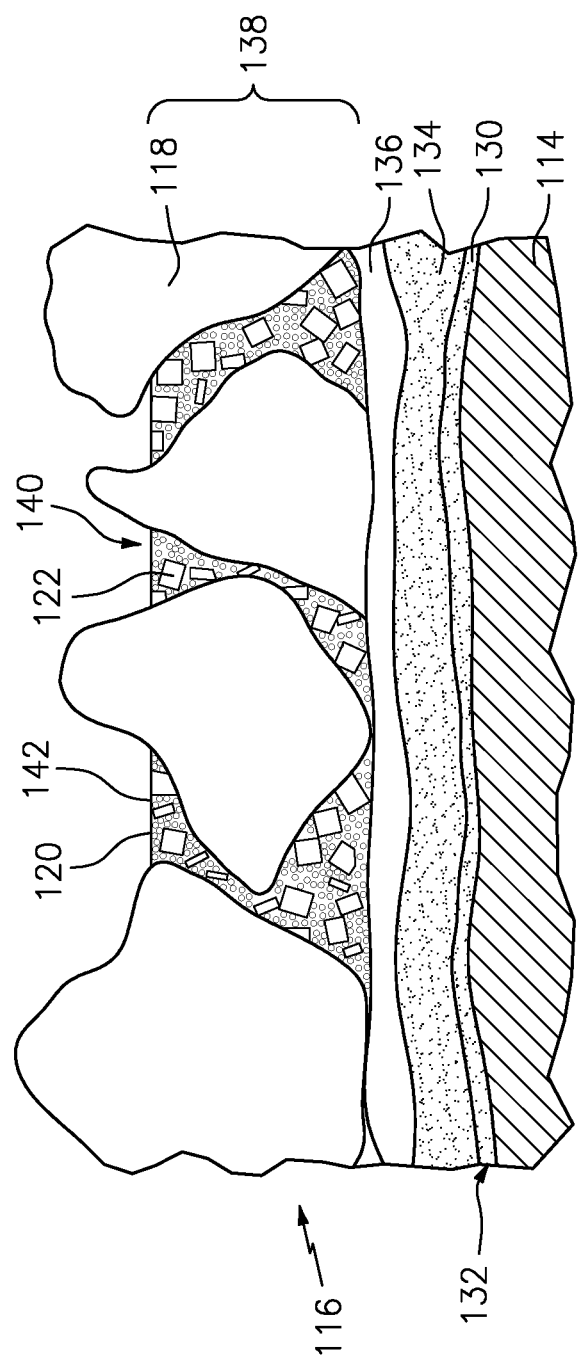
FIG. 4 is a schematic cross-sectional view of the exemplary abrasive blade tip coating.

Referring to FIG. 4 an exemplary abrasive coating 116 is shown. The abrasive coating 116 includes the large first grit particles 118 and relatively smaller second grit particles 122 interspersed throughout the matrix 120, but typically in the range of 10 to 1 diameter ratio.

This abrasion protection thus enables greater first grit 118 retention by maintaining support from the matrix composite material 120.

In alternative embodiments, the large first grit particles 118 can comprise hard materials. In an exemplary embodiment, the grit 118 can comprise: zirconia, aluminum oxide, aluminum di-boride, aluminum nitride, aluminum nitride-carbon, diamond, silicon carbide, cubic boron nitride or other engineered grit particles. In an exemplary embodiment, the second grit 122 can range in size from about 0.5 to about 2 microns (0.0005 to about 0.002 mm). The second grit particles 122 can comprise the same material as the larger grit particles 18. Other materials can be employed for the small grit 122. In an exemplary embodiment, the second grit particles 122 can comprise a smaller, high modulus, higher strength, and/or higher abrasion resistant material that is less costly than the first grit particle 118. Thus, the larger first grit particle 118 can be a more expensive material such as, diamond and the second grit 122 can be less expensive since, it does not perform the bulk of the cutting and instead performs the function of improving the strength of the matrix composite material 120 and the function of spacing the first grits and also providing conduits for the chips and debris removal.

Referring also to FIG. 4, the abrasive coating 116 can include a strike layer 130 bonded to a top surface 132 of the blade tip 114. The strike layer (flash layer) 130 can be the same material as the matrix 120. In an exemplary embodiment, the strike layer 130 can comprise nickel, nickel alloy and the like. The strike layer 130 can be from about 1 micron to about 2.5 microns in thickness. The strike layer 130 can be electrolytically deposited using Wood's nickel strike solution, which can comprise nickel chloride and hydrochloric acid. In an exemplary embodiment the strike layer 130 can be deposited from an electrolyte based on a nickel sulfamate chemistry.

A base layer 134 can be deposited over the strike layer 130. The base layer 134 can comprise a thin deposit of nickel material. In an exemplary embodiment the base layer 134 can be between about 5 microns and 8 microns in thickness. In an exemplary embodiment, the base layer 134 can be electrolytically deposited from a nickel sulfamate plating solution comprising nickel sulfamate, nickel chloride, and boric acid solution. In an exemplary embodiment, the base layer 134 can include nickel sulfate based chemistries.

A tack layer 136 is deposited over the base layer 134. The tack layer 136 is utilized to attach the large first grit particles 118 to the base layer 134. The tack layer 136 tacks the larger first grit particles 118 to the base layer 134 on the component, such as a blade tip 112, by electrolytically depositing nickel around the larger first grit particles 118 to secure the particles 118 into place on the base layer 134. The first grit 118 can be tacked onto the base layer 134 with the tack layer 136 by depositing nickel from a sulfamate nickel plating bath as described in more detail with respect to FIG. 6.

An overplate layer 138 which includes the matrix 120 can be built up around the first grit 118 and on top of the tack layer 136. The matrix 120 envelops the second grit particles 122 and the matrix 120 material bonds to and partially surrounds the first grit particles 118. The matrix 120 can include the smaller finer second grit 122. The base layer 134, tack layer 136, and overplate layer 138 can comprise nickel plate formed from a sulfamate nickel plating bath. The over plate layer 138 can incorporate the smaller second grit particles 122. The first grit particles 118 extend above the overplate layer 138 with the matrix material 120 and the second grit particles 122 relative to the top surface 132. The overplate layer 138 having the matrix 120 with second grit 122 can be built up by electrolytically depositing nickel from a sulfamate nickel plating bath, as described with more detail with respect to FIG. 7. Channels 140 are formed between the larger first grit particles 118 and above an upper surface 142 of the overplate layer 142.

The spaces between the first grit particles 118 should be such that the first grit particles 118 are spaced at a linear length of 1 to 3 first grit particle 118 diameters to produce sufficient spacing to produce the channels 140 for cut chips and debris to pass during the cutting process. The first grit particles 118 are specifically spaced apart. The spacing can provide channels 140 between each first grit particle 118. Engineered abrasive resistance of the composite, composed of second particles 122 and matrix composite material 120, provides abrasion resistance of the recessed channels 140 between the first grit particles 118. The channel 140 comprises a composite having a strength and abrasion resistance greater than a strength and abrasion of the matrix 120 alone.

The channel 140 can be configured to provide superior support and bonding strength for the first grit particle 118.

The combination of the smaller second grit particles 122 blended with the matrix material 120 securely bonded with and surrounding the larger first grit particles 118 achieves a higher strength and abrasion resistance than merely having only the matrix 120 surrounding the first grit particles 118. The combination of smaller second grit particles 122 and matrix 120 also provides superior support to the first grit particles 118.

Figure 5:
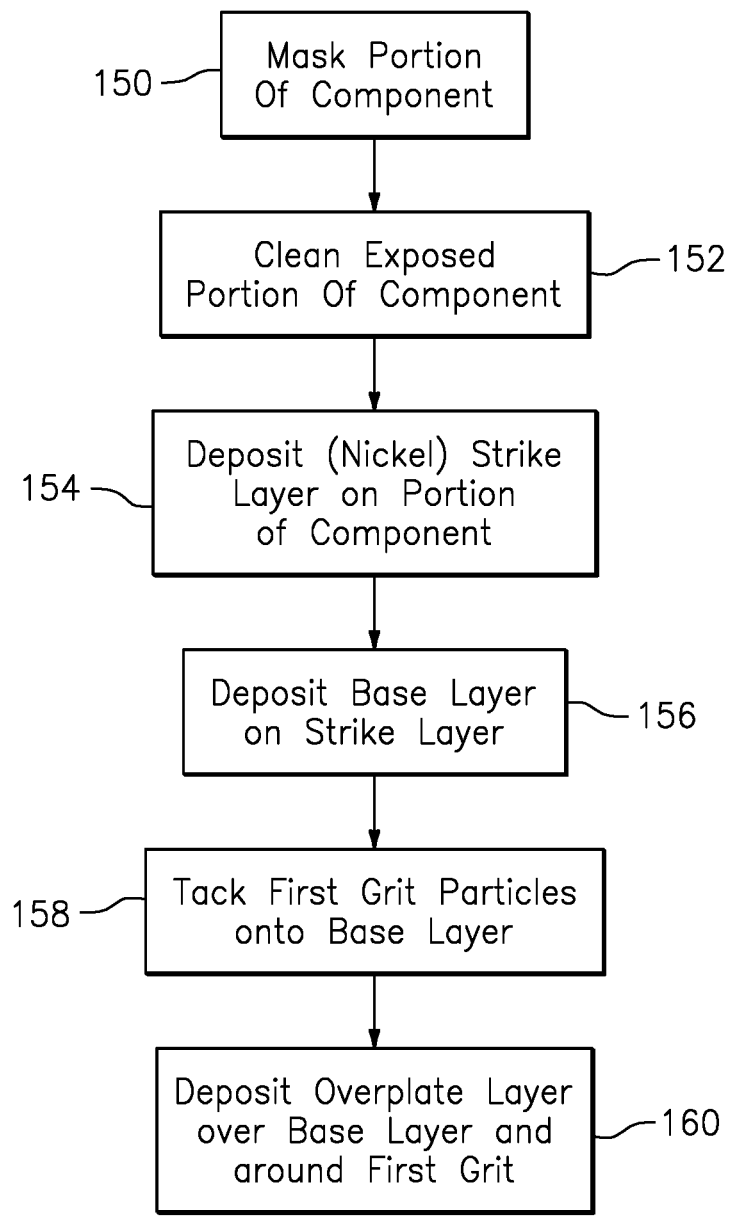
FIG. 5 is a process map of an exemplary process for applying an abrasive blade tip coating.

Referring to FIG. 5, an exemplary process flow chart is shown for the process of applying the abrasive coating 116. A turbine rotor blade is described in this exemplary embodiment, however other components that can receive an abrasive coating 116 are also contemplated.

In an exemplary embodiment, the process can include providing a component, such as a gas turbine engine rotor with blades. At step 150, a mask is applied to at least a portion of the component, exposing a portion of the component for further processing. In an exemplary embodiment, the component is a rotor with blades. The rotor and blades are masked, i.e., covered leaving the blade tip exposed. The next step 152, the exposed portion of the component is cleaned. In an exemplary embodiment, the tip of the blade can be wet blasted. Wet blasting includes a wet abrasive blast or impingement on the blade tips with a fine grit alumina slurry to remove surface oxides and contaminants. The blade tips can also be electrolytically etched in a hydrochloric acid solution, making the blade tips anodic. A spray rinse can be part of the cleaning step as well. The blade tip can also include a desmut process to remove surface smut. The surface smut is a byproduct of the electrolytic etching process. The desmut process can include using an acid dip. Preferably a nitric acid and hydrofluoric acid solution can be utilized for the desmut process. The blade tip is once again spray rinsed as part of the cleaning step. It is contemplated that other cleaning processes can be performed depending upon the component base material and surface contamination.

At step 154 the strike/flash layer is deposited on the exposed portion of the component. In the exemplary embodiment, the strike layer is deposited onto the blade tips. The strike layer is electrolytically deposited as a nickel strike layer onto the blade tips using a Wood's nickel strike solution. In an exemplary embodiment a nickel chloride and hydrochloric acid solution is deployed. In an exemplary embodiment, a nickel sulfamate base chemistry can be utilized to form the strike layer.

At step 156 the base layer is deposited on the strike layer. In an exemplary embodiment, the base layer is electrolytically deposited as a thin layer of nickel from a nickel sulfamate plating solution. The nickel sulfamate solution can include nickel sulfamate, nickel chloride and boric acid.

Figure 6:
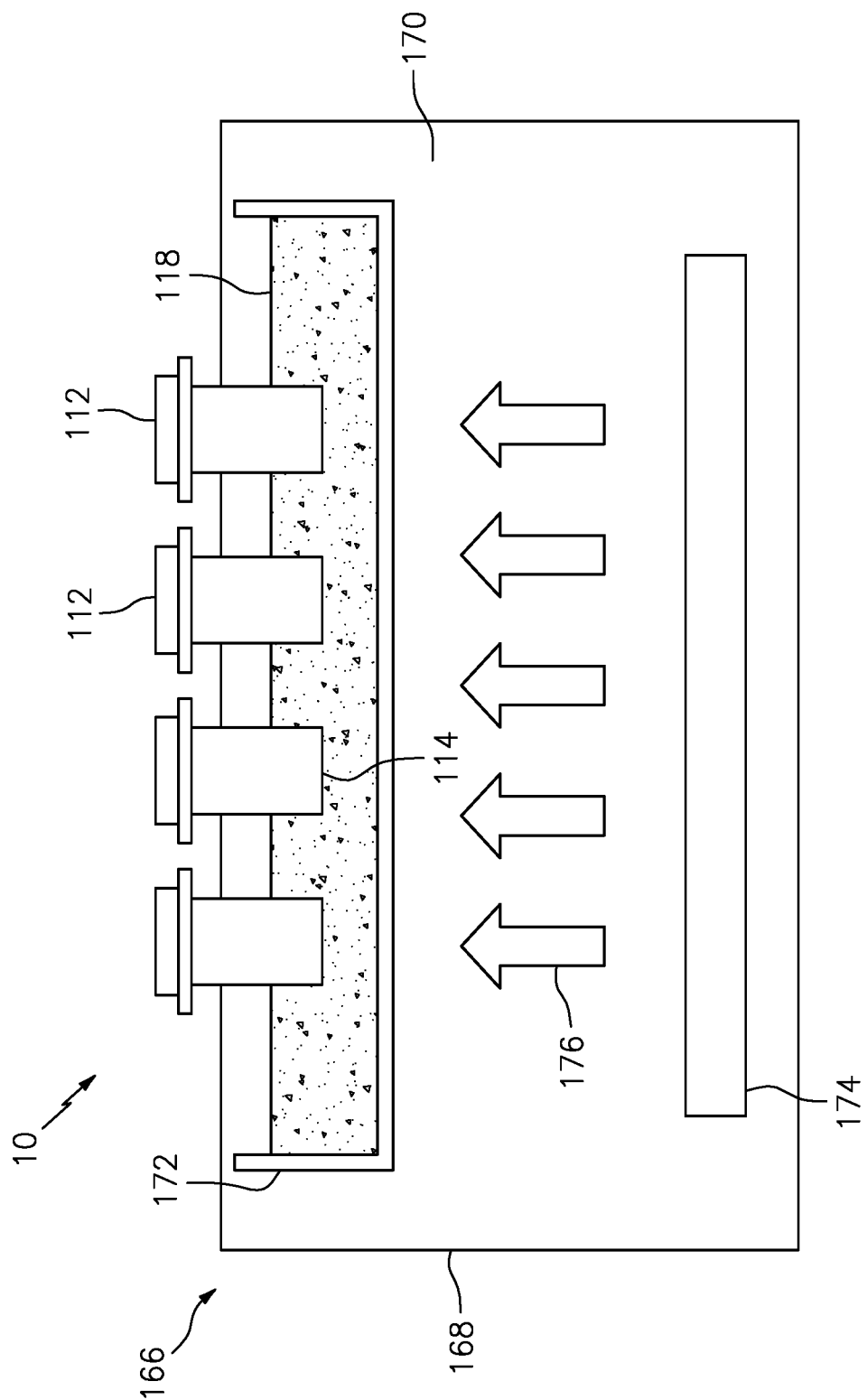
FIG. 6 illustrates a schematic of an exemplary large grit plating bath.

At step 158 the first grit particles can be tacked, i.e., attached to, onto the base layer of the component. In an exemplary embodiment, the larger first grit particles of abrasive are attached by electrolytically depositing nickel around the abrasive grits as the abrasive first grit particles are physically held in contact with the base layer. The nickel deposit used to tack the first grit particles to the base layer can be deposited from a sulfamate nickel plating bath, as shown in FIG. 6.

At step 160 the overplate layer is deposited over the base layer and partially surrounding the first grit particles tacked to the base layer. The overplate layer includes the matrix and the second grit particles dispersed throughout the matrix. In an exemplary embodiment, the step of depositing the overplate layer includes building up the matrix, such as a nickel matrix, with the embedded fine second grit particles by electrolytically depositing nickel from a sulfamate nickel plating bath, while simultaneously co-depositing the second grit particles, i.e., fine abrasive grit particles. The second grit particles are held in suspension in the nickel plating bath solution by an agitation mechanism in the plating tank, details are described with reference to FIG. 7. The suspended, fine abrasive second grit particles will gradually fall out of suspension and settle onto the rotor blade tips, where the second grit particles will be encapsulated in the nickel plating. The second grit particles will become a part of the nickel matrix surrounding the larger first grit particles.

In an exemplary embodiment, the rotor blades will be removed from the plating bath after sufficient overplate layer has built up. The component can be rinsed to remove any excess plating materials.

The component can be bake finished to relieve any plating stress and to remove hydrogen.

FIG. 6 illustrates a schematic of an exemplary large grit plating bath 166. Reference FIG. 4 in addition to FIG. 6 for the following description. The plating bath 166 can include a tank 168, which contains a plating solution 170. A grit basket 172 is immersed in the plating solution 170. The basket 172 is configured to contain the larger first grit 118 abrasive particles while allowing the plating solution 170 to flow into and contact with the component 10. In the exemplary embodiment shown at FIG. 6, the component 10 includes blades 112 with tips 114 exposed. An anode 174 is positioned in the tank 168 outside of and below the basket 172 such that electrical current 176 can flow up through the basket 172 past the grit particles 118 to the component, i.e., blade tips 114. The blades 112 are inserted into the plating solution 170 inside the basket 172 such that the exposed portion, i.e., tips 114 are submerged. The basket 172 includes a fine mesh bottom that blocks the escape of the first grit particles 118 but allows for the solution 170 to fill the basket 172 and surround the blades 112. The tack layer 136 is deposited electrolytically along with the larger first grit particles 118 that are in contact with the blade tip 114. The nickel plating of the tack layer 136 forms around the first grit particles 118, tacking them into place on the base layer 134.

Figure 7:
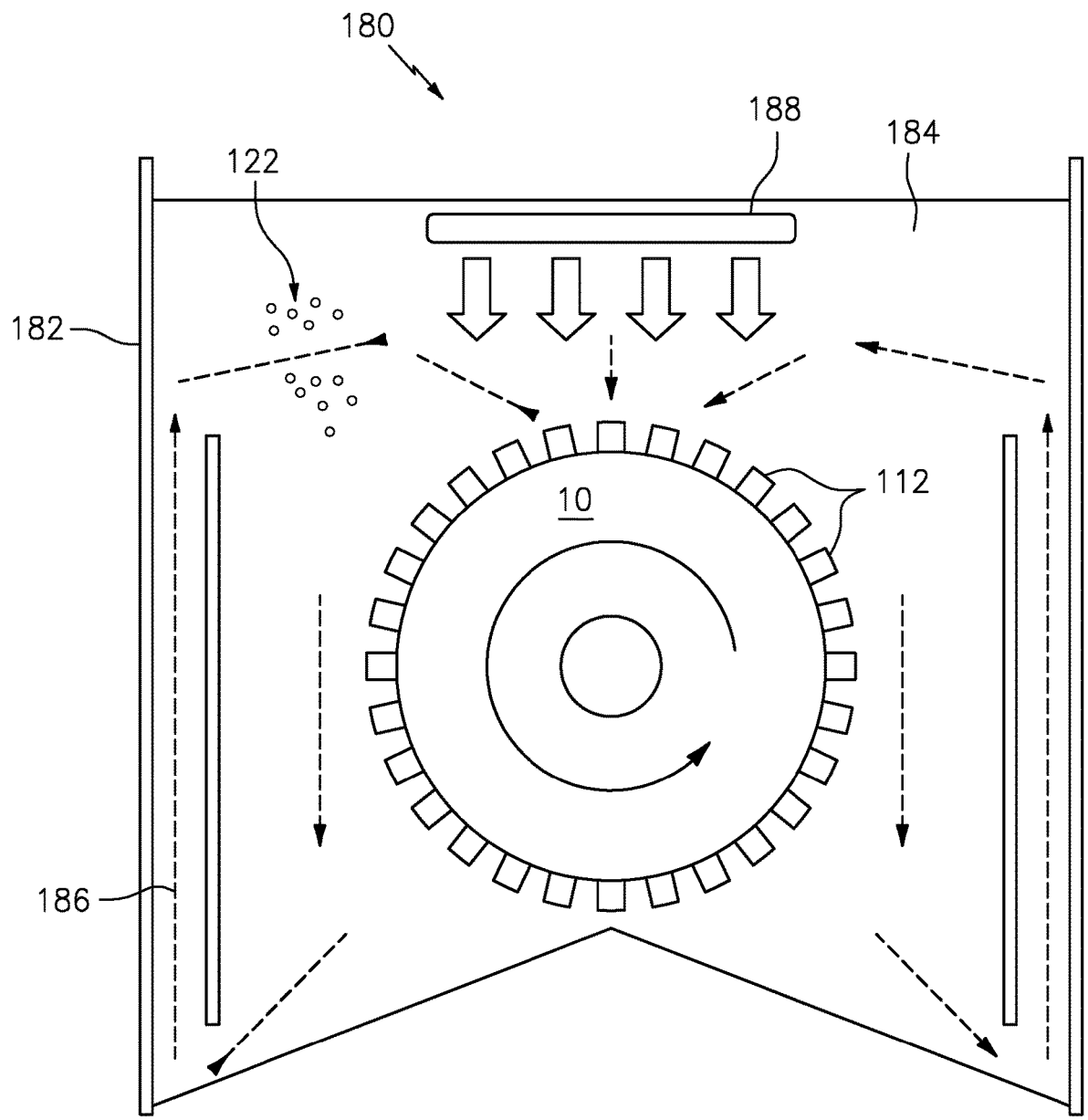
FIG. 7 illustrates a schematic of an exemplary small grit plating bath.

FIG. 7 illustrates a schematic of an exemplary fine grit plating bath 180. Reference FIG. 4 in addition to FIG. 7 for the following description. In an exemplary embodiment, the component 10, i.e., turbine engine rotor blades 112, for example blades on an IBR, can be processed for depositing the overplate layer 138. The plating bath 180 includes a tank 182 containing a plating solution 184. An air agitation system 186 is installed in the tank 182 and configured to agitate the plating solution and circulate the fine abrasive second grit particles 122 in suspension in the plating solution 184. The rotor with blades 112 is placed in the tank 182 such that the submerged rotor can rotate allowing the blades 112 to be exposed in the direction of an anode 188 located in the tank 182. The anode 188 is positioned in the tank 182 above the component and configured to direct electrical current down onto the blade tips 112. The overplate layer 160 can be deposited using the fine grit plating bath 180. The blades 112 on the rotor are exposed to the current as the rotor rotates in the tank 182. The blade tips 114 face upwards at some point during the processing. The nickel matrix 120 plating with fine second grit 122 can build up on the blade tips surrounding the larger first grit tacked to the base layer. The nickel matrix with the encapsulated fine abrasive second grit can build-up evenly on all of the blade tips. The air agitation system 186 circulates the fine second grit particles 122 through the tank 182. The second grit particles 122 can fall onto the upwardly facing blade tips 112.

CBN super abrasive coatings (cubic boron nitride grit in a nickel metal matrix) applied via an electroplating process to airfoil blade tips are designed to allow the airfoils to withstand hard rubbing interactions with abradable air seals.

The disclosure addresses the vulnerability of the nickel metal matrix upon removal of the CBN grit particles (In a CBN—nickel abrasive coating), by offering a mechanism of imparting improved hardness and wear capabilities to the nickel metal matrix itself.

The disclosed method involves incorporating two different sizes of CBN abrasive particles into an electrolytically deposited wear resistance coating (Either by constant current plating or pulsed current plating), one size being in the range of 0.5-2.0 micron particles, and the other being in the range of 50-200 micron particles. The larger, 50-200 micron size CBN grit can be tacked to the surface of the blade tip, similarly to how CBN abrasive coatings are currently produced, and then the 0.5-2 micron size grit can be plated into the nickel metal matrix surrounding the larger grits and can be dispersed evenly throughout the matrix, giving the matrix improved wear capabilities independent of the wear capability imparted to the coating by the larger CBN grits. This CBN coating would therefore have 2 simultaneous wear resistance mechanisms.

The disclosed coating can provide increased hardness, improved wear resistance, and improved erosion resistance to CBN abrasive coatings applied to compressor blade tips.

By increasing the wear resistance of the nickel matrix, the coating life will be increased because the coating will be able to perform its wear resistance function even after the primary wear resistance mechanism (the larger CBN grits) have been removed from the coating during regular wear caused by engine operation.

Increasing the coating life could possibly reduce or eliminate the need for strip and recoat of the coating during engine overhaul, providing logistical (time saving) and financial (cost reduction) benefits.

There has been provided the wear resistant coating incorporating multiple sizes of super abrasive particles and process of application. While the wear resistant coating incorporating multiple sizes of super abrasive particles has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An abrasive coating on a gas turbine engine component substrate, comprising:
    a top surface formed on said gas turbine engine component substrate;
    a strike layer formed on said top surface;
    a base layer coupled to said strike layer;
    a tack layer coupled to said base layer;
    a plurality of first grit particles coupled to said tack layer, wherein said plurality of first grit particles are spaced apart to form channels; spaces between the first grit particles are spaced at a linear length of 1 to 3 first grit particle diameters to produce the channels;
    a plurality of second grit particles ranging in size from 0.0005 to about 0.002 mm placed between each of said plurality of first grit particles, said second grit particles having a nominal size smaller than said first grit particles; and
    an overplate layer comprising a matrix material coupled to said tack layer; said matrix material envelops said second grit particles and said matrix material bonds to and partially surrounds said first grit particles, wherein said first grit particles extend above said overplate layer.

2. The coating according to claim 1, wherein said first grit particles are selected from the group consisting of a cubic boron nitride material, coated silicon carbide (Sic), aluminum oxide, and diamond.

3. The coating according to claim 1, wherein said matrix material comprises a matrix formed from at least one of Ni, Co and MCrAlY, wherein M is Ni, or Co, or a combination thereof.

4. The coating according to claim 1, wherein said second grit particles are selected from the group consisting of alumina, silicon nitride, and cubic boron nitride.

5. The coating according to claim 1, wherein the second grit particles range from about 75% to about 98% of a total number of the first grit particles and the second grit particles.

6. The coating according to claim 1, wherein said overplate layer comprises a height from the tack layer of 50% to 90% of a height of the first grit particles.

\* \* \* \* \*